Oct. 3, 1967  A. H. WAKEMAN  3,344,587
APPARATUS FOR SEPARATING AIR FROM LIQUIDS
Filed Oct. 7, 1965  2 Sheets-Sheet 1

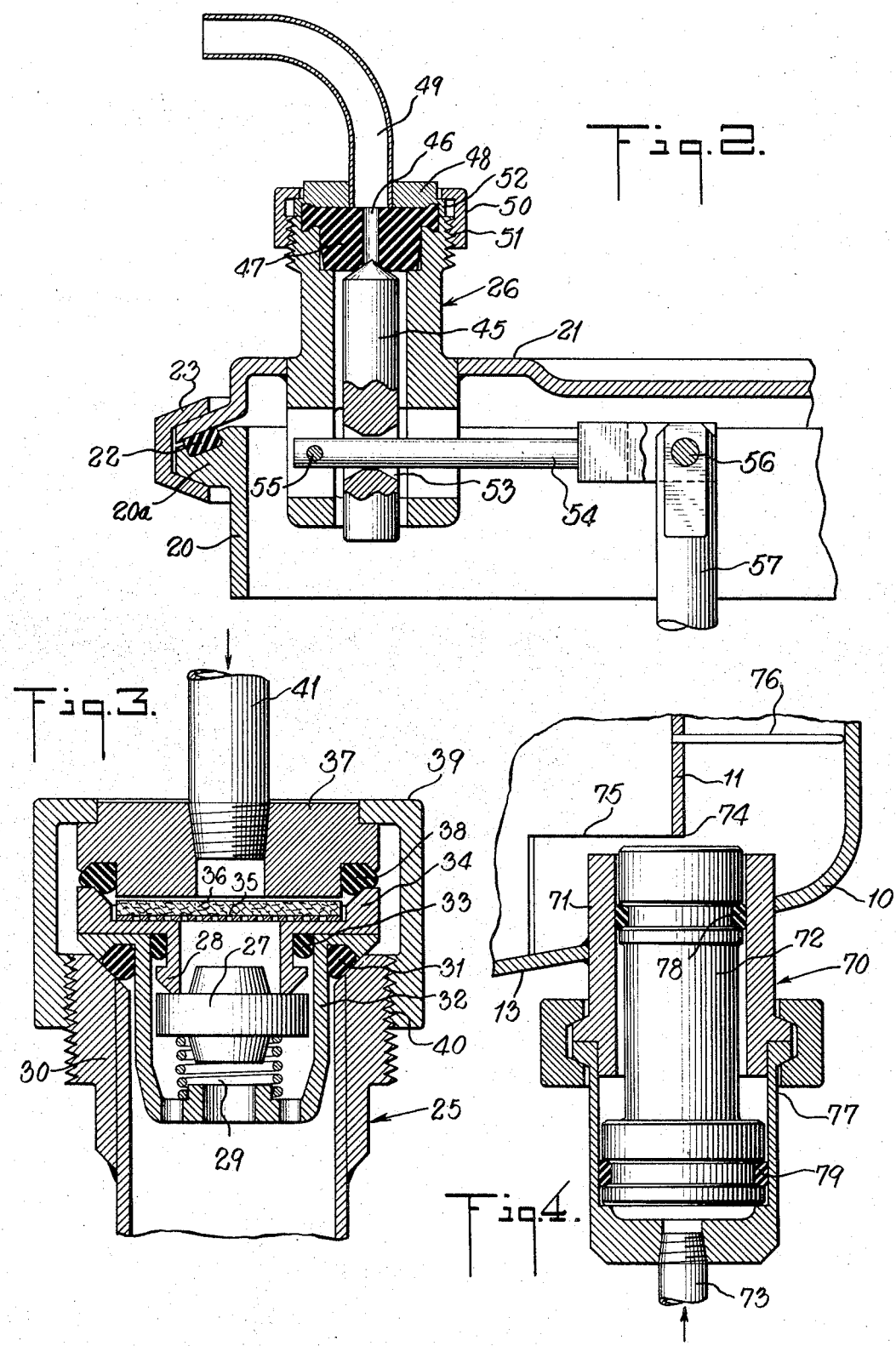

United States Patent Office 3,344,587
Patented Oct. 3, 1967

3,344,587
APPARATUS FOR SEPARATING AIR
FROM LIQUIDS
Alden H. Wakeman, Lake Mills, Wis., assignor to St.
Regis Paper Company, New York, N.Y., a corporation
of New York
Filed Oct. 7, 1965, Ser. No. 493,639
3 Claims. (Cl. 55—170)

This invention relates to apparatus for separating air from liquids.

Among other possible uses, the apparatus of the invention is particularly adapted for removing air, which may be in the form of bubbles of various sizes, from liquids or liquid mixtures, such as milk, food mixtures and the like. The invention is particularly useful in cases such as where the liquid material is being transferred from one place or tank to another, and it is desired accurately to meter the quantity thereof as transferred through a conduit and in order that the meter may operate properly and accurately register the amount of liquid free of any inaccuracies due to the presence of air therein.

While apparatus of various types for such purposes has heretofore been known, the present invention provides a substantially improved arrangement which will operate reliably even though the quantities of air contained in the liquid may vary widely from time to time or with various different types of liquid mixtures, and also an apparatus in which the problems are facilitated of draining and thoroughly cleaning the equipment from time to time while the operating parts remain in place.

Various further and more specific objects, features and advantages of the invention will appear from the description given below, taken in connection with the accompanying drawings, illustrating by way of example a preferred form of the invention.

FIG. 2 is an enlarged sectional view taken along a vertical plane in which the line 2—2 of FIG. 1 lies;

FIG. 3 is a vertical sectional view taken along line 3—3 of FIG. 1; and

FIG. 4 is a sectional view taken along a vertical plane in which the line 4—4 lies.

Figure 1:
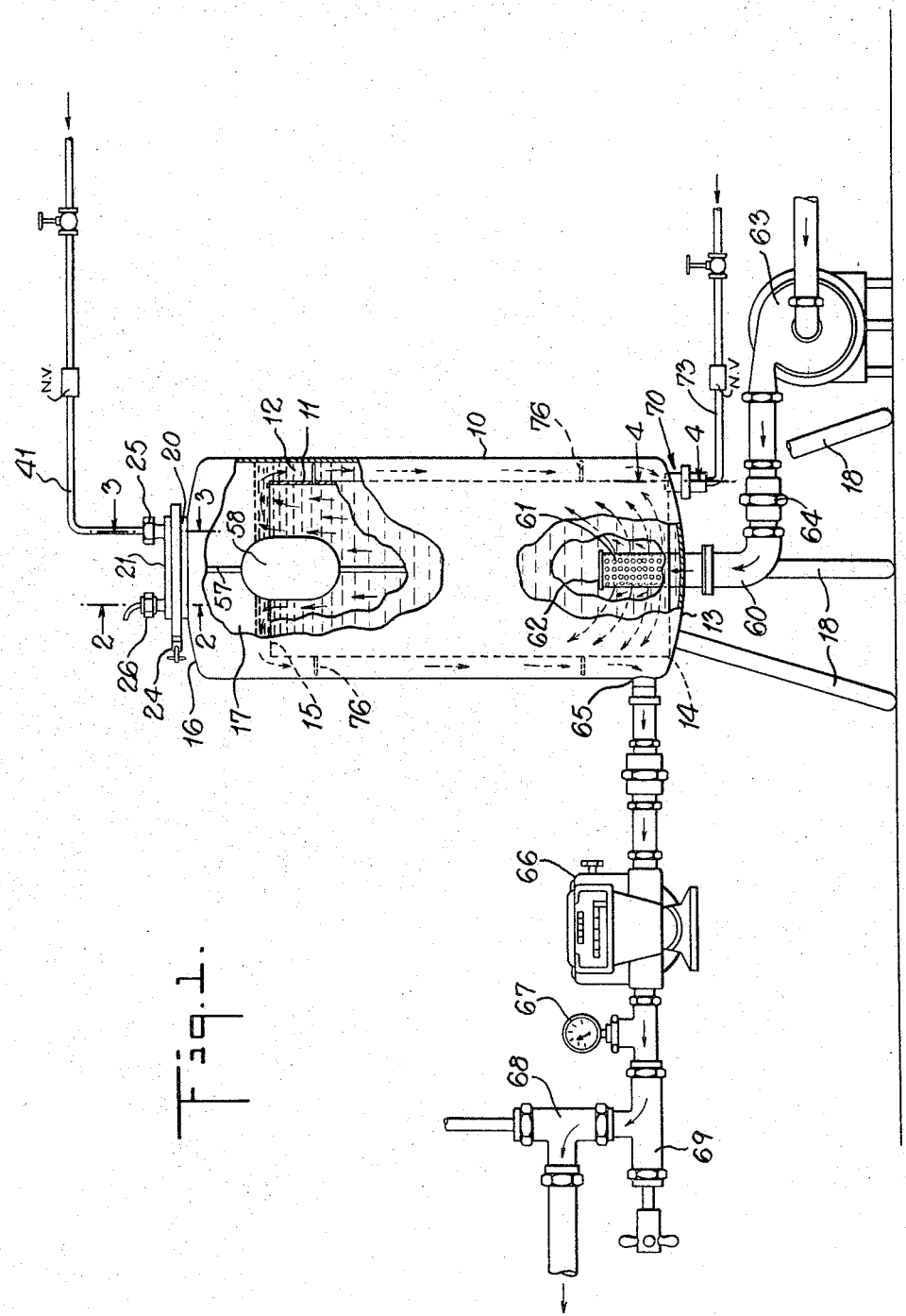
FIG. 1 is an elevational view of a preferred embodiment of equipment in accordance with the invention, portions thereof being broken away to show certain interior parts.

Referring to FIG. 1 in further detail, the apparatus as shown may comprise a normally sealed, generally cylindrical tank 10 formed of a suitable metal, such as stainless steel or other corrosion resistant material, and in which tank the air separation takes place. An inner and preferably generally cylindrical member 11 is contained in this tank and is of a size such as to provide a generally circumferential space 12 between the external surface of member 11 and the interior wall surface of the tank. The bottom of the tank 10 may be formed with a downwardly bulging rounded portion as at 13 and the bottom end edges of the cylinder 11 may normally rest as at 14 in contact along an annular line with the interior surface of the tank bottom. The upper end edges, as at 15, of the cylinder 11 will normally be at a position substantially below the rounded top portion 16 in the tank, so that there will normally be a substantial air space 17 within the top of the tank and above the liquid level, as hereinafter explained.

The top and bottom portions of the tank 10 may preferably be made integral with the walls of the tank so as smoothly to merge therewith to facilitate draining and cleaning. The tank may be supported on suitable legs as at 18, secured to the bottom thereof. The top of the tank may be formed with a large central access opening with an upstanding flange 20 (see FIG. 2) adapted to be closed by a removable cover 21. A sealing gasket 22 may be provided beneath the rim of the cover, and such rim may be removably clamped against a flange portion 20a by suitable clamping means of channel-shaped cross-section, as indicated at 23. This clamping means may be comprised of a pair of semicircular members hinged at one side of the cover and secured with respect to each other as by threaded clamping means 24 at the other side (see FIG. 1). The cover may be provided with air inlet means at 25 and air outlet means at 26.

The air inlet means, as better shown in FIG. 3, may contain a check valve, including a spring-pressed valve piece 27, adapted to be urged against a valve seat 28 by spring 29, the assembly of these parts being removably insertable into the mouth of a short conduit portion 30, secured to the cover 21 and opening into the tank 10. A rubber O-ring 31 may be used to seal an annular enclosure 32 for the valve parts with respect to the upper inlet end of the conduit portion 30. The valve seat portion 28 depends into the part 32, and these two parts may be sealed with respect to each other by another O-ring 33. The valve seat portion 28 depends from a shallow cup-shaped portion integral therewith (as indicated at 34) containing a perforated washer 35 or other suitable foraminous member which supports a filter disc 36 of suitable porous material, held down in place as by a plug 37 and sealed with respect to the portion 34 as by O-ring means 38. The plug 37 is clamped down against the assembly by a ferrule 39 having a threaded connection as at 40 with the portion 30. Air may be admitted through a pipe 41 to pass down through the filter means 35, 36; thence through the check valve means, at appropriate times, into the tank 10.

The air outlet or nipple 26 (as shown in FIG. 2) extends in sealed relation down through the cover 21 and is made hollow so as to contain a valve piece 45 therein, adapted to engage in a central aperture 46 in a rubber or other preferably resilient valve seat member 47. The latter is adapted to be engaged and held in place by member 48, sealed with respect to an outlet pipe 49 which runs therethrough, the periphery of the member 48 having an annular rim adapted to be clamped down as by a ferrule 50 having threaded connection as at 51 with the outlet piece 26. The member 48 may be sealed at its periphery with respect to the adjacent parts as by a gasket 52.

The air outlet valve piece 45 (as shown in FIG. 2) may have a transverse aperture as at 53 near its lower end, through which extends a lever 54 pivoted at 55 to a depending portion of the outlet piece 26. The end of the lever 54 inwardly of the tank may be suitably pivotally connected as at 56 to a vertical rod 57 on which a float member as at 58 is mounted, as shown in FIG. 1. Any suitable means (not shown) may be used for guiding the support for this float to permit the float to move up and down while holding the same in proper vertical position.

The tank 10 may be connected at the middle of the bottom thereof with an inlet pipe 60, which opens into a cylindrical piece 61 formed with numerous apertures distributed throughout its side walls, the upper end of the cylinder 61 being closed as by a coverpiece 62.

The fluid from which the air is to be separated may be pumped into the apparatus as by a suitable rotary pump means 63, the outlet of which is connected through a suitable strainer at 64, if desired, to the separator inlet pipe 60.

The liquid outlet for the tank 10 preferably is located at the bottom of its side walls as at 65, an outlet pipe being connected to conduct the deaerated liquid through a meter as at 66 past a pressure gauge 67, if desired, thence through suitable further outlet connections 68. A valve 69 may be provided and same is adapted when desired to be partially closed so as to afford some degree of back pressure against the liquid flowing from the pump through the apparatus.

As above stated, the lower edge of the inner cylinder piece 11 rests normally against the bottom of the tank 10, but when it is desired fully to drain the apparatus and to blow out any remaining liquid preparatory to admitting cleaning fluid thereto, or when it is desired to drain such cleaning fluid, the cylindrical piece 11 is adapted to be raised somewhat from the bottom 13 of the tank 10 by air pressure operated plunger means such as shown generally at 70 in FIG. 1 and in further detail in the sectional view thereof in FIG. 4. This arrangement may comprise a short nipple-like piece 71 sealed through the bottom 13 of the tank and containing a plunger 72 adapted normally to assume its downward position (as shown in FIG. 4) and adapted to be raised by air pressure through a line 73, thereby to engage an edge portion 74 of the cylindrical piece 11 and to raise same from contact with the bottom of the tank 10. As indicated in FIG. 4, a lower side wall portion of the cylindrical piece 11 may be cut away as at 75 to afford space for this plunger device. The side walls of the piece 11 may be provided at spaced points with several pins as at 76 protruding into slidable engagement with the interior wall surfaces of the tank so as to retain the cylindrical piece 11 suitably centered with respect to the tank. The plunger 72 may be surrounded with suitable coupling and closure means as at 77 to permit removal, replacement, cleaning or inspection of the plunger and associated parts, or the sealing rings 78 and 79 therefor.

In the normal operation of the apparatus, fluid as pumped in through the inlet connection 60 up into the perforated cylinder 61, will be caused to become discharged generally radially outwardly through the perforations, as indicated generally by the arrows, and so as to fill the inner cylinder 11 with the liquid at a greatly reduced velocity, as compared with its velocity through the inlet pipe. It should be noted that the purpose of the perforated cylinder 61 is not that of a filter, but rather this is a device for dispersing the relatively rapidly moving stream coming in through pipe 60 so as to form a multiplicity of distributed streams which come together in the bottom portions of the chamber 11 to form conjointly a much lower velocity, upwardly flowing mass of the liquid. The small cap or cover 62 prevents any of the liquid from gushing directly upwardly. Thus the liquid will flow slowly upwardly and, in a typical case, its upward velocity should be, for example, in the neighborhood of 0.5 foot per second or less. This slowly upwardly moving liquid completely fills the inner cylinder 11 and fills the tank 10 normally to a point maintained substantially above the upper edge 15 of the inner cylinder. Then the liquid will continue to flow slowly radially outwardly above the upper edge of the cylinder 11 and thence slowly downwardly (as indicated by the arrows) in the space 12 between the cylinder and the inside walls of the tank, and finally to the outlet connection 65. Due to the low velocity of the stream of large cross-section upwardly within the cylinder 11, the bubbles of air as contained therein will readily escape from the liquid into the air space 17 above the liquid level. Some additional bubbles (if any remain) may tend, by reason of gravity, to rise from the liquid as it flows downwardly through the space 12, so that by the time the liquid arrives at the outlet 65, it will be free of measurable air.

Meanwhile, the float 58 acts so to control the air outlet valve piece 45 that the liquid level will fluctuate only very slightly from a desired ideal level substantially above the upper rim of the cylindrical piece 11. This insures that such rim will not become exposed and act as a weir which would tend to create turbulence interfering with proper separation of air from the liquid. That is, as the liquid level tends to rise slightly, thus raising the float, this, as will be evident from FIG. 2, will cause the air outlet valve piece 45 to close the air outlet to outlet pipe 49. This allows air pressure to increase slightly within the air space 17 in the top of the tank, thereby checking the further rise of the liquid level. Then, as a further result, the liquid level will tend to drop slightly, thus again opening the air outlet valve and reducing the pressure in the air space 17 again. However, this simple float-operated valve means may under some circumstances be insufficient to prevent the upper portion within the apparatus from becoming "water-logged," so to speak. For example, if for a time the liquid or liquid mixtures being treated are such as to have very little or no air entrapped within same for some intervals, then, of course, there will be no air escaping therefrom to maintain the body of air filling the space 17 and some of the air in such space may even become dissolved or absorbed in the liquid, thereby allowing the liquid eventually more or less to fill the tank 10 to the top.

Thus, to prevent such conditions from occurring, the air inlet valve means 25 (as shown in FIG. 3) is utilized preferably so as constantly to introduce into the top of the tank 10 a small supply of clean air under pressure from the pipe 41 and through the check valve at 27, 28. If the liquid being treated contains a generally uniform amount of air, very little clean air is usually needed to be thus introduced, particularly in cases such as the deaeration of milk; but when the liquid initially rushes into the unit, more air may be required to act as a cushion. In a typical case, such as where the tank 10 has a diameter of about 15" and a height of some 38", such air under pressure may be introduced at a rate in the neighborhood of 10 cubic feet per hour and at a gauge pressure of a minimum of about 5 pounds per square inch above the head pressure of the system.

Under some circumstances, if the liquid being treated does not readily release its air, suction means may be applied to the air outlet 49 to create above the liquid in the tank some degree of evacuation, and in that case a suction pump may be applied to the liquid outlet connection for the apparatus, to suck the fluid through the apparatus, instead of pumping same in under pressure. In that event, clean air is still preferably admitted through the connection 41 so as to insure maintenance of an air space under some vacuum at 17, above the liquid level in the tank. When a vacuum to some degree is used, the bubbles in the liquid will tend to become rapidly larger as they arise and escape from the surface of the liquid.

Upon completion of a period of operation of the apparatus, for instance at the end of a day, prior to cleaning same, the liquid remaining therein may be blown out in the following manner. First, the air outlet through pipe 49 may be restricted by removing such parts of the outlet valve (shown in FIG. 2) as desired, and replacing same with a cap. Ample air may then be admitted through the connection 41 to blow any remaining liquid from the tank and the parts therein. Meanwhile, air under pressure is admitted through connection 73 to raise the plunger 72 (as shown in FIG. 4) thus elevating cylindrical piece 11 readily to allow the liquid to be blown from the bottom portions of the tank. After the apparatus has thus been blown free of liquid, it is desirable to blow air from the connections beyond the meter, which preferably should be done after closing the valve 69 so as not to damage the meter as the result of passing only air therethrough.

Then, in order to clean the apparatus with the various parts therein still in place, the air outlet parts as shown in FIG. 2, may be restored to the condition there shown, except with the rubber valve piece 47 omitted. Then ample cleaning fluid may be forced into and through the apparatus to clean the outlet valve parts and other parts in the apparatus. In this case the tank will become completely filled with the cleaning fluid, in view of the omission of the rubber or outlet valve piece 46. During the flow of cleaning fluid through the apparatus, the air inlet 41 should be closed, but the plunger 72 for holding the cylindrical piece 11 raised, should remain in its upward position, holding the cylinder 11 off the bottom of the separator tank, allowing both the inner and outer surfaces of the cylinder 11 to be readily cleaned by the flowing mass of the cleaning fluid.

Although a particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for separating gases from liquid comprising in combination: a closed tank of substantial height; an inlet for the liquid at the bottom region of the tank and an outlet therefor also at the bottom region of the tank but spaced from the inlet, the upper portion of said tank normally being adapted to contain a volume of air above a normal liquid level spaced from the top of the tank; means for dispersing the liquid entering said inlet and for directing same as a slowly-moving volume up to substantially such liquid level and thence slowly downwardly to said outlet; valve means and control means therefor for automatically releasing from time to time excess amounts of air from said upper portion of the tank; means for maintaining a preselected air pressure in the space above the liquid level, said last named means including an air inlet pipe connected to the upper portion of said tank above said liquid level, a check valve mounted in said inlet pipe for admitting air under pressure to said space above the liquid level when the pressure in said space is sufficiently below that of the source of air for said air inlet pipe, thereby to supply air to said space in addition to such air as is supplied thereto by separation from the liquid.

2. Apparatus for separating gases from liquid comprising in combination: a closed tank having an inlet for the liquid at the region of the mid portion of the bottom, an outlet for gas at the top thereof, and an outlet for the liquid at the region of the periphery of the bottom, the upper portion of said tank normally being adapted to contain a volume of air above a normal liquid level spaced from the top of the tank, means to maintain said normal liquid level; an inner chamber member surrounding a substantial portion of the space within said tank and normally resting on the bottom thereof and having upstanding wall portions extending upwardly in spaced relation to the interior wall surfaces of the tank; and fluid pressure operated plunger means at the bottom of the tank positioned to engage a lower portion of said chamber member and operative by fluid pressure, thereby to elevate said chamber member within the tank to facilitate draining of liquid from the apparatus.

3. An apparatus for removing gases from a liquid which comprises in combination
 (a) a closed tank of substantial height,
 (b) an inlet conduit for liquids located at the middle region of the bottom wall of the tank,
 (c) an outlet conduit for liquids located in the side wall of the tank near its bottom,
 (d) a partition inside the tank consisting essentially of an impervious cylindrical wall that is open at both its top and bottom ends and surrounds a preponderant portion of the space within the mid portion of the tank, the bottom rim of the partition being normally supported by the bottom wall of the tank, the partition being of such height that a substantial free space remains between the top rim of the partition and the top wall of the tank, and being so located with respect to the side wall of the tank that there is adequate space for the flow of liquid between the side wall and the partition,
 (e) a diffuser consisting essentially of a tubular member having perforated side walls and closed at the top, which diffuser communicates at its bottom with said inlet conduit,
 (f) a gas-release valve located in a conduit communicating with the free space at the upper region of the tank,
 (g) a float operatively connected to open the gas-release valve in response to the lowering, and to close it in response to the raising, of the level of the liquid in the apparatus when the apparatus is being used for the removal of gases from the liquid, and
 (h) a movable piston that is so positioned as to elevate a portion of the bottom rim of said partition to facilitate the ultimate draining of the liquid from, or cleaning of, the apparatus.

References Cited

UNITED STATES PATENTS

| 1,048,473 | 12/1912 | Baker | 55—422 |
| 2,197,595 | 4/1940 | Schneible | 55—310 |
| 2,518,995 | 8/1950 | Owen | 55—112 X |
| 3,070,935 | 1/1963 | De Leon | 55—170 |
| 3,074,645 | 1/1963 | Main | 55—192 |

FOREIGN PATENTS

| 25,388 | 3/1930 | Australia. |
| 804,439 | 4/1951 | Germany. |

REUBEN FRIEDMAN, *Primary Examiner.*

J. ADEE, *Assistant Examiner.*